United States Patent
Shimada et al.

(10) Patent No.: US 7,993,547 B2
(45) Date of Patent: *Aug. 9, 2011

(54) SEMICONDUCTOR CERAMIC COMPOSITION AND PROCESS FOR PRODUCING THE SAME

(75) Inventors: Takeshi Shimada, Saitama (JP); Kazuya Toji, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/444,895

(22) PCT Filed: Oct. 26, 2007

(86) PCT No.: PCT/JP2007/070958
§ 371 (c)(1),
(2), (4) Date: Apr. 9, 2009

(87) PCT Pub. No.: WO2008/053813
PCT Pub. Date: May 8, 2008

(65) Prior Publication Data
US 2010/0012905 A1    Jan. 21, 2010

(30) Foreign Application Priority Data

Nov. 1, 2006    (JP) .................................. 2006-298304

(51) Int. Cl.
*H01B 1/08* (2006.01)
*C04B 35/46* (2006.01)
(52) U.S. Cl. ................... 252/520.21; 501/138; 501/139; 423/598
(58) Field of Classification Search ............. 252/520.21; 423/598; 501/137–139; 338/22 SD
See application file for complete search history.

(56) References Cited

U.S. PATENT DOCUMENTS
3,962,146 A    6/1976    Matsuoka et al.
(Continued)

FOREIGN PATENT DOCUMENTS
JP    50-58106    5/1975
(Continued)

OTHER PUBLICATIONS

International Search Report issued in PCT/JP2007/070958 on Dec. 11, 2007.
Huo et al., "Effects of $Bi_{1/2}Na_{1/2}TiO_3$ on the Curie temperature and the PTC effects of $BaTiO_3$-based positive temperature coefficient ceramics," *Sensors and Actuators A*, vol. 128 (2006), pp. 265-269.
English Translation of Search Report issued in International Patent Application No. PCT/JP2006/309038 on Jul. 4, 2006.
(Continued)

*Primary Examiner* — Mark Kopec
(74) *Attorney, Agent, or Firm* — Stein McEwen, LLP

(57) ABSTRACT

It is intended to provide a semiconductor ceramic composition in which a part of Ba in $BaTiO_3$ is substituted with Bi—Na, which is capable of restraining the evaporation of Bi in the calcination step, is capable of restraining the compositional deviation of Bi—Na thereby suppressing the formation of different phases, is capable of further reducing the resistivity at room temperature, and is capable of restraining the fluctuation of the Curie temperature; and to provide a production process of the same. When a calcined $Ba(TiM)O_3$ powder (M is a semiconductor dopant) and a calcined $(BiNa)TiO_3$ powder are separately prepared and the $Ba(TiM)O_3$ powder is calcined at a relatively high temperature while the (BiNa) $TiO_3$ powder is at a relatively low temperature, both at the most suitable temperatures for them, then the evaporation of Bi may be retarded and the compositional deviation of Bi—Na may be thereby suppressed to inhibit the formation of different phases; and when these calcined powders are mixed, formed and sintered, then a semiconductor ceramic composition which has a low resistivity at room temperature and is capable of restraining the fluctuation of the Curie temperature can be obtained.

8 Claims, 1 Drawing Sheet

U.S. PATENT DOCUMENTS

| | | | |
|---|---|---|---|
| 6,221,800 | B1 | 4/2001 | Takahashi et al. |
| 7,090,785 | B2 * | 8/2006 | Chiang et al. ............ 252/62.9 R |
| 7,700,509 | B2 * | 4/2010 | Shimada et al. ............. 501/137 |
| 7,704,906 | B2 * | 4/2010 | Shimada et al. ............. 501/137 |
| 2002/0036282 | A1 * | 3/2002 | Chiang et al. ............ 252/62.9 R |
| 2009/0105064 | A1 * | 4/2009 | Shimada et al. ............. 501/138 |
| 2010/0012905 | A1 * | 1/2010 | Shimada et al. ......... 252/520.21 |
| 2010/0075824 | A1 * | 3/2010 | Shimada ...................... 501/123 |

FOREIGN PATENT DOCUMENTS

| | | |
|---|---|---|
| JP | 56-169301 | 12/1981 |
| JP | 2005-22891 | 1/2005 |
| JP | 2005-255493 | 9/2005 |
| WO | WO 2006/106910 | 10/2006 |
| WO | WO2006/118274 * | 11/2006 |
| WO | WO 2007/097462 | 8/2007 |

OTHER PUBLICATIONS 109 proceedings of Ceramics Material Committee of Society of Material Science 13-14 (2003).

Takeuchi et al., "Effect of Firing Atmosphere on Electrical and Spectroscopic Properties of Barium Titanate Ceramics Codoped with La and Mn," *J. Soc. Mat. Sci.*, Japan, vol. 52, No. 10, pp. 1155-1159 (2003).

English Translation of AKASHI (JP 56-169301).

Abicht et al., "The Influence of Silicon on Microstructure and Electrical Properties of La-doped $BaTiO_3$ Ceramics," *Journal of Materials Science*, vol. 26, pp. 2337-2342 (1991).

MacChesney et al., "Factors and Mechanisms Affecting the Positive Temperature Coefficient of Resistivity of Barium Titanate," *Journal of the American Ceramic Society*, vol. 48, No. 2, pp. 81-88 (1965).

Extended European Search Report issued Apr. 19, 2011, in European Application No. 07830692.5-2214/2078707 PCT/JP2007070958.

* cited by examiner

SEMICONDUCTOR CERAMIC COMPOSITION AND PROCESS FOR PRODUCING THE SAME

CROSS-REFERENCE TO RELATED APPLICATIONS

This application claims the benefit of PCT International Patent Application No. PCT/JP2007/070958, filed Oct. 26, 2007, and Japanese Patent Application No. 2006-298304, filed Nov. 1, 2006, in the Japanese Patent Office, the disclosures of which are incorporated herein by reference.

BACKGROUND OF THE INVENTION

1. Field of the Invention

The present invention relates to a semiconductor ceramic composition having a positive resistive temperature, which is used for a PTC thermistor, a PTC heater, a PTC switch, a temperature detector and the like, and a process for producing the same.

2. Description of the Related Art

As materials showing a PTCR characteristic (Positive Temperature Coefficient of Resistivity), compositions in which various semiconductor dopants are added to $BaTiO_3$ have been conventionally proposed. These compositions have a Curie temperature around 120° C. Depending upon the use, it becomes necessary for these compositions to shift the Curie temperature thereof.

It has been proposed to shift the Curie temperature by adding, for example, $SrTiO_3$ to $BaTiO_3$. However, the Curie temperature shifts only to a negative direction and does not shift to a positive direction in this case. Currently, only $PbTiO_3$ is known as an additive material for shifting the Curie temperature to a positive direction. However, since $PbTiO_3$ contains an element that causes environmental pollution, a material using no $PbTiO_3$ has been demanded in recent years.

Regarding $BaTiO_3$ semiconductor ceramics, there is proposed a process for producing a $BaTiO_3$ semiconductor ceramic by adding one or more of Nb, Ta and rare earth elements to a composition having a structure of $Ba_{1-2x}(BiNa)_xTiO_3$, wherein a part of Ba in $BaTiO_3$ in which no $PbTiO_3$ is used is substituted with Bi—Na and x is controlled to be in a range of $0<x\leq0.15$, sintering the composition in nitrogen, and then subjecting the composition to a heat treatment in an oxidizing atmosphere, for the purpose of restraining the reduction in the temperature coefficient of resistance due to Pb substitution and for the purpose of reducing the voltage dependence to thereby enhance the producibility and the reliability of the semiconductor ceramic (see, Patent Document 1).

Patent Document 1: JP-A-56-169301

SUMMARY OF THE INVENTION

Patent Document 1 discloses in Examples, mixing, before calcination thereof, all the constituents such as the starting materials including $BaCO_3$, $TiO_2$, $Bi_2O_3$, $Na_2O_3$ and PbO, followed by calcining, forming, sintering and heat-treating.

However, in the composition where a part of Ba of $BaTiO_3$ is substituted with Bi—Na, when all the constituents are mixed before calcination thereof as in Patent Document 1, then Bi may evaporate during the calcination step to cause compositional deviation in Bi—Na, whereby the formation of different phases is accelerated, and increase in the resistivity at room temperature and fluctuation of the Curie temperature may be caused.

It may be considered to perform calcination at a low temperature for restraining the evaporation of Bi. However, although the evaporation of Bi is certainly restrained by this method, a complete solid solution cannot be formed and the desired characteristics cannot be obtained.

An object of the invention is to provide a semiconductor ceramic composition containing no Pb, which is capable of shifting the Curie temperate to a positive direction and of widely reducing the resistivity at room temperature; and to provide a production process of the same.

Further, it is another object of the invention to provide a semiconductor ceramic composition in which a part of Ba in $BaTiO_3$ is substituted with Bi—Na, which is capable of restraining the evaporation of Bi in the calcination step, is capable of restraining the compositional deviation of Bi—Na thereby suppressing the formation of different phases, is capable of further reducing the resistivity at room temperature, and is capable of restraining the fluctuation of the Curie temperature; and to provide a production process of the same.

As a result of intensive studies for attaining the above objects, the inventors have found that, in producing a semiconductor ceramic composition in which a part of Ba in $BaTiO_3$ is substituted with Bi—Na, when a calcined Ba(TiM)$O_3$ powder (M is a semiconductor dopant) and a calcined (BiNa)$TiO_3$ powder are separately prepared and the Ba(TiM)$O_3$ powder is calcined at a relatively high temperature while the (BiNa)$TiO_3$ powder is calcined at a relatively low temperature, both at the most suitable temperatures for them, then the evaporation of Bi from the calcined Ba(TiM)$O_3$ powder may be retarded and the compositional deviation of Bi—Na may be thereby suppressed to inhibit the formation of different phases; and when these calcined powders are mixed, formed and sintered, then a semiconductor ceramic composition which has a low resistivity at room temperature and is capable of restraining the fluctuation of the Curie temperature can be obtained.

The invention provides a process for producing a semiconductor ceramic composition in which a part of Ba of $BaTiO_3$ is substituted with Bi—Na, the process comprising a step of preparing a calcined powder of Ba(TiM)$O_3$ (wherein M is a semiconductor dopant), a step of preparing a calcined powder of (BiNa)$TiO_3$, a step of mixing the calcined powder of Ba(TiM)$O_3$ and the calcined powder of (BiNa)$TiO_3$, and a step of forming and sintering the mixed calcined powder.

The invention further proposes, in the production process of the above-mentioned constitution:

a constitution in which a calcination temperature in the step of preparing the calcined powder of Ba(TiM)$O_3$ is from 900 to 1300° C.;

a constitution in which a calcination temperature in the step of preparing the calcined powder of (BiNa)$TiO_3$ is from 700 to 950° C.;

a constitution in which a dry mixing is conducted in the step of mixing the calcined powder of Ba(TiM)$O_3$ and the calcined powder of (BiNa)$TiO_3$;

a constitution in which 3.0 mol % or less of Si oxide and 4.0 mol % or less of Ca carbonate or Ca oxide are added before the calcination in the step of preparing the calcined powder of Ba(TiM)$O_3$ or the step of preparing the calcined powder of (BiNa)$TiO_3$ or in both the two steps;

a constitution in which 3.0 mol % or less of Si oxide and 4.0 mol % or less of Ca carbonate or Ca oxide are added in the step of mixing the calcined powder of Ba(TiM)$O_3$ and the calcined powder of (BiNa)$TiO_3$;

a constitution in which the semiconductor dopant M is at least one of Nb and Sb, and the semiconductor ceramic composition is represented by a composition formula: $[(BiNa)_x Ba_{1-x}][Ti_{1-y}M_y]O_3$ in which x and y each satisfy $0<x\leq0.3$ and $0<y\leq0.005$; and a constitution in which the ratio of Bi to Na satisfies a relationship that Bi/Na is 0.78 to 1.

The invention also provides a semiconductor ceramic composition obtained by forming and sintering a mixed calcined powder containing a calcined powder of $Ba(TiM)O_3$ (wherein M is a semiconductor dopant and is at least one of Nb and Sb) and a calcined powder of $(BiNa)TiO_3$, wherein the composition is represented by a composition formula: $[(BiNa)_x Ba_{1-x}][Ti_{1-y}M_y]O_3$ in which x and y each satisfy $0<x\leq0.3$ and $0<y\leq0.005$, and the ratio of Bi to Na satisfies a relationship that Bi/Na is 0.78 to 1.

According to the invention, there can be provided a semiconductor ceramic composition capable of rising the Curie temperature and capable of greatly reducing the resistivity at room temperature without using Pb that causes environmental pollution.

According to the invention, there can be provided a semiconductor ceramic composition capable of restraining the evaporation of Bi in the calcination step, capable of restraining the compositional deviation in Bi—Na to thereby inhibit the formation of different phases, capable of further reducing the resistivity at room temperature, and capable of restraining the fluctuation of the Curie temperature.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
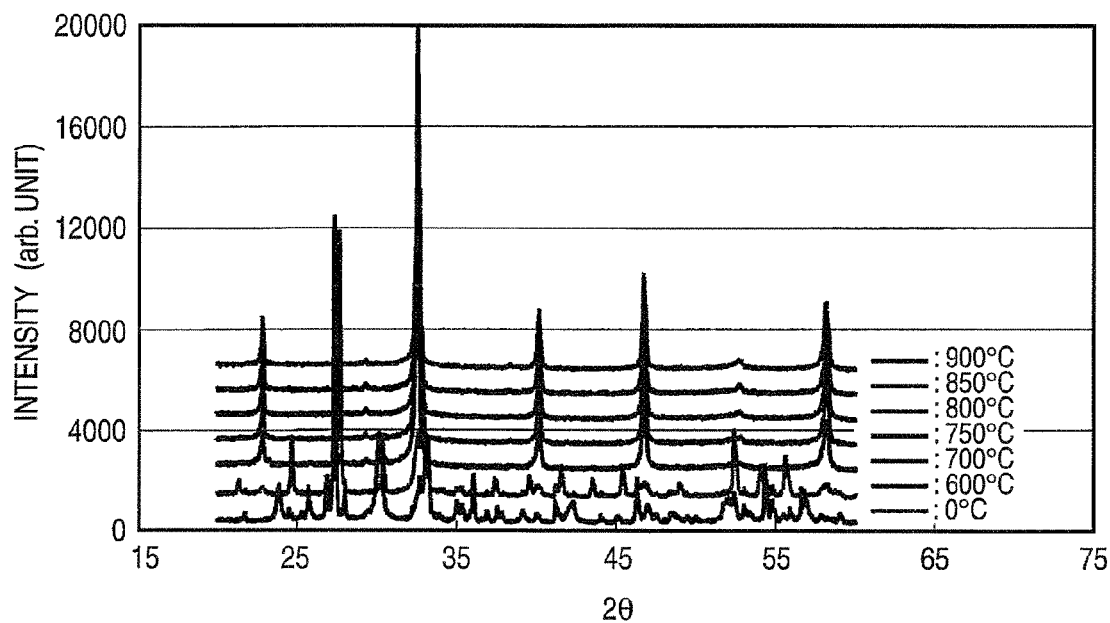
FIG. 1 is a graph showing the X-ray diffraction patterns of a semiconductor ceramic composition of the invention at different calcination temperatures.

In the step of preparing a calcined powder of $Ba(TiM)O_3$ (M is a semiconductor dopant) in the invention, first, $BaCO_3$ and $TiO_2$ as main starting materials and $Nb_2O_5$ or $Sb_2O_3$ as a semiconductor ingredient are mixed to prepare a mixed starting powder, and then the powder is calcined. The calcination temperature is preferably in the range of from 900 to 1300° C., and the calcination time is preferably 0.5 hours or more. When the calcination temperature is lower than 900° C. or the calcination time is shorter than 0.5 hours, $Ba(TiM)O_3$ is not completely formed, and the unreacted BaO may react with water in the atmosphere or in the mixed medium to unfavorably cause compositional deviation. On the other hand, when the calcination temperature exceeds 1300° C., then a sintered body is generated in the calcined powder, which unfavorably hinders the dissolution with a $(BiNa)TiO_3$ calcined powder to be mixed later.

The step of preparing a $(BiNa)TiO_3$ calcined powder in the invention includes mixing $Na_2CO_3$, $Bi_2O_3$ and $TiO_2$ as starting powders to prepare a mixed starting powder, followed by calcining the powder. The calcination temperature is preferably in the range of from 700 to 950° C., and the calcination time is preferably from 0.5 to 10 hours. When the calcination temperature is lower than 700° C. or the calcination time is shorter than 0.5 hours, unreacted NaO may react with water in the atmosphere or in the solvent in wet mixing to unfavorably cause compositional deviation or characteristic fluctuation. On the other hand, when the calcination temperature exceeds 950° C. or the calcination time is longer than 10 hours, then Bi may evaporate greatly to unfavorably cause compositional deviation and promote formation of different phases.

Incidentally, with respect to the preferred calcination temperature in the step of preparing the $Ba(TiM)O_3$ calcined powder (from 900 to 1300° C.) and the preferred calcination temperature in the step of preparing the $(BiNa)TiO_3$ calcined powder (from 700 to 950° C.), it is preferred to select optimal temperatures according to use and the like. For example, for performing sufficient reaction while restraining the evaporation of Bi, the calcination temperature of $(BiNa)TiO_3$ is preferably relatively low by the adjustment of the calcination time and the like. It is preferred to set the calcination temperature of $(BiNa)TiO_3$ lower than the calcination temperature of $Ba(TiM)O_3$.

A main feature of the invention is that the step of preparing the $Ba(TiM)O_3$ calcined powder and the step of preparing the $(BiNa)TiO_3$ calcined powder are carried out separately, and accordingly, Bi is restrained from evaporating away from $(BiNa)TiO_3$ in the calcination step and the compositional deviation of Bi—Na is restrained to inhibit the formation of different phases; and the invention thus provides a semiconductor ceramic composition of which the resistivity at room temperature is further reduced and of which the Curie temperature is restrained from fluctuating.

In the steps of preparing the above-mentioned calcined powders, the starting material powders may be crushed in mixing depending upon the grain sizes of the material powders. Mixture and crushing may be performed by any of wet mixing and crushing using pure water and ethanol, and dry mixing and crushing, but dry mixing and crushing is preferred for the reason of capable of restraining compositional deviation. Further, $BaCO_3$, $Na_2CO_3$ and $TiO_2$ are exemplified as the starting materials in the above, but the advantage of the invention is not impaired even when other Ba compounds, Na compounds and the like are used.

As described above, after separately preparing a $Ba(TiM)O_3$ calcined powder and a $(BiNa)TiO_3$ calcined powder, the calcined powders are mixed each in a prescribed amount. Mixing may be performed by any of wet mixing using pure water and ethanol, and dry mixing, but dry mixing is preferred for capable of restraining compositional deviation. Depending upon the grain sizes of the calcined powders, crushing may be carried out after mixing, or mixing and crushing may be performed at the same time. The average grain size of the mixed calcined powder after mixing and crushing is preferably from 0.6 to 1.5 μm.

In the above-mentioned step of preparing the $Ba(TiM)O_3$ calcined powder and/or the step of preparing the $(BiNa)TiO_3$ calcined powder, or in the step of mixing the calcined powders, adding at most 3.0 mol % of Si oxide and at most 4.0 mol % of Ca oxide or Ca carbonate is favorable because Si oxide may restrain the abnormal growth of crystal grains and may readily control the resistivity of the composition, and Ca oxide or Ca carbonate may enhance the sinterability of the composition at low temperatures and may control the reducibility thereof. However, when either one of them is added in an amount exceeding the above-mentioned limit, then it is unfavorable since the composition cannot be semiconductive. Preferably, the addition is attained before mixing in each step.

A semiconductor ceramic composition according to the invention can be obtained by forming and sintering the mixed calcined powder obtained in the step of mixing the $Ba(TiM)O_3$ calcined powder and the $(BiNa)TiO_3$ calcined powder.

One example of a process after the step of mixing the calcined powders is described below, to which, however, the invention should not be limited. Any and every known method is employable in the invention.

The mixed calcined powder obtained in the step of mixing a Ba(TiM)O$_3$ calcined powder and a (BiNa)TiO$_3$ calcined powder may be formed by any desired forming means. Before forming, if desired, the crushed powder may be granulated in a granulation apparatus. The density of the compact after the forming is preferably from 2 to 3 g/cm$^3$.

The sintering may be attained in air or in a reducing atmosphere, or in an inert gas atmosphere having a low oxygen concentration, at a sintering temperature of from 1200° C. to 1400° C. for a sintering time of from 2 hours to 6 hours. One preferred embodiment of the sintering step is described below. In case where the powder is granulated before forming, it is preferably processed for binder removal at 300° C. to 700° C. before sintering.

In the sintering step at a sintering temperature of from 1290° C. to 1350° C. in an atmosphere having an oxygen concentration of less than 1%, the powder is sintered (1) for a sintering time of shorter than 4 hours, or (2) for a sintering time to satisfy a formula: $\Delta T \geqq 25t$ (t=sintering time (hr), $\Delta T$=cooling rate (° C./hr) after sintering), and then the sintered body is cooled at the cooling rate satisfying the above formula.

According to the sintering step of any mode mentioned in the above, where the sintering time is shortened, or the sintering time is kept long but the sintered body is rapidly cooled at a suitable rapid cooling rate in accordance with the sintering time, a semiconductor ceramic composition having an improved temperature coefficient of resistance in a high-temperature range (not lower than the Curie temperature) while maintaining a low resistivity at room temperature can be obtained without the necessity of heat treatment in air like that for BaTiO$_3$ materials.

In the above sintering step, the atmosphere having an oxygen atmosphere of less than 1% means a vacuum or an inert gas atmosphere having an oxygen atmosphere of less than 1%. Preferred is an inert gas atmosphere, for example, a nitrogen gas or argon gas atmosphere. The atmosphere in cooling after the sintering is also preferably the above-mentioned atmosphere, but is not always limitative.

In case where the sintering step mode is the above method (1), the cooling condition after the sintering may be selected in any desired manner. On the other hand, when the above method (2) is selected, the cooling rate $\Delta t$ (° C./hr) is determined by the sintering time t. For example, when the sintering time t is 1 hour, then the cooling rate $\Delta T$ is 25×1=25° C./hr or more; and when the sintering time t is 4 hours, then the cooling rate $\Delta T$ is 25×4=100° C./hr or more. In other words, when the sintering time t is long, then the cooling rate $\Delta T$ shall be higher in accordance with the sintering time. This method may be effective when the sintering time t is long, but is applicable to a shorter sintering time t (for example, shorter than 4 hours).

The semiconductor ceramic composition to which the invention is directed is BaTiO$_3$ in which a part of Ba is substituted with Bi—Na. As so mentioned in the above, this is obtained according to a process including separately conducting the step of preparing a calcined Ba(TiM)O$_3$ powder (M is a semiconductor dopant) and the step of preparing a calcined (BiNa)TiO$_3$ powder, followed by mixing, forming and sintering.

The composition in which a part of BaTiO$_3$ is substituted with Bi—Na is processed into a semiconductor ceramic composition by adding a semiconductor dopant thereto, followed by valence control of the composition. In the invention, the semiconductor dopant is added to BaTiO$_3$ to give a calcined Ba(TiM)O$_3$ powder (M is semiconductor dopant), and the resulting semiconductor ceramic composition is represented by a composition formula: $[(BiNa)_xBa_{1-x}][Ti_{1-y}M_y]O_3$ in which x and y each satisfy $0<x\leqq0.3$ and $0<y\leqq0.005$.

In the composition represented by $[(BiNa)_xBa_{1-x}][Ti_{1-y}M_y]O_3$, x represents the component range of (BiNa), and x is preferably in the range of $0<x\leqq0.3$. The Curie temperature cannot be shifted to a high temperature side when x is 0; while when it is higher than 0.3, the resistivity at room temperature may be near to $10^4$ $\Omega$cm and is unfavorable since the composition could hardly be applied to PTC heaters, etc.

M is at least one of Nb and Sb, but is preferably Nb. In the composition, y represents the component range of M, and y is preferably in the range of $0<y\leqq0.005$. When y is 0, then the valence control is impossible, and the composition cannot be semiconductive; while when it is more than 0.005, then the resistivity at room temperature may unfavorably be more than $10^3$ $\Omega$cm. The range $0<y\leqq0.005$ means 0 to 0.5 mol % (not including 0 mol %) in terms of mol % expression.

In the above composition represented by $[(BiNa)_xBa_{1-x}][Ti_{1-y}M_y]O_3$, Ti is substituted with an element M for valence control. In this case, the addition of the element M (the amount to be added, $0<y\leqq0.005$) may be small for valence control, since the addition is for valence control of the tetravalent element Ti site. This is advantageous in that the internal strain of the obtained semiconductor ceramic composition can be reduced.

In the above-mentioned composition represented by $[(BiNa)_xBa_{1-x}][Ti_{1-y}M_y]O_3$, the ratio of Bi to Na is preferably 1/1, or that is, the composition formula is preferably $[(Bi_{0.5}Na_{0.5})_xBa_{1-x}][Ti_{1-y}M_y]O_3$. However, as so described in the section of the background art, when all the constituents are mixed before calcination, then Bi may vaporize in the calcination step to cause compositional deviation in Bi—Na, whereby the formation of different phases may be accelerated, and accompanied by the problems in that the resistivity at room temperature increases and the Curie temperature may fluctuate.

In the invention, by separately calcining a calcined powder of Ba(TiM)O$_3$ and a calcined powder of (BiNa)TiO$_3$ composition respectively at optimal temperatures, the proportion of Bi to Na can be made to satisfy that Bi/Na is from 0.78 to 1, so that the resistivity at room temperature can be further lowered and the fluctuation in the Curie temperature can be restrained. When Bi/Na is more than 1, then Bi not participating in the formation of (BiNa)TiO$_3$ may remain in the material to readily form different phases in sintering, whereby the resistivity at room temperature may unfavorably increase; while when it is less than 0.78, then different phases may be readily formed in the sintering step and the resistivity at room temperature may unfavorably increase.

According to the above-mentioned production process, a semiconductor ceramic composition represented by a composition formula: $[(BiNa)_xBa_{1-x}][Ti_{1-y}M_y]O_3$ (wherein M is at least one of Nb and Sb), in which x and y each satisfy $0<x\leqq0.3$ and $0<y\leqq0.005$ and the ratio of Bi to Na satisfies the relationship that Bi/Na is from 0.78 to 1 can be obtained; and the semiconductor ceramic composition is advantageous in that it may have an increased Curie Temperature and may have a greatly lowered resistivity at room temperature, without necessity of Pb that causes environmental pollution.

EXAMPLES

Example 1

BaCO$_3$ and TiO$_2$ as main materials and Nb$_2$O$_5$ as a semiconductor ingredient powder were prepared and blended so as to be $Ba(Ti_{0.998}Nb_{0.002})O_3$, followed by mixing in pure water. The obtained mixed material powder was calcined at 1000° C. for 4 hours to prepare a $Ba(TiNb)O_3$ calcined powder.

$Na_2CO_3$, $Bi_2O_3$ and $TiO_2$ as material powders were prepared and blended so as to be $(Bi_{0.5}Na_{0.5})TiO_3$, followed by mixing in ethanol. The obtained mixed material powder was calcined in air at 600° C. to 900° C. for 4 hours to prepare a $(BiNa)TiO_3$ calcined powder. FIG. 1 shows the X-ray diffraction patterns of the obtained $(Bi_{0.5}Na_{0.5})TiO_3$ calcined powder at different calcination temperatures of from 600° C. to 900° C.

The $Ba(TiNb)O_3$ calcined powder and the $(BiNa)TiO_3$ calcined powder calcined at 800° C. were blended so as to be 73/7 in a molar ratio, then 0.4 mol % of $SiO_2$ and 1.4 mol % of $CaCO_3$ were added thereto as sintering promoters, and these were mixed and crushed in a pot mill with pure water as a medium until the mixed calcined powder had a center grain size of from 1.0 µm to 2.0 µm, and then dried. PVA was added to the crushed powder of the mixed calcined powder, followed by mixing, and the mixture was granulated with a granulator. The granulated powder thus obtained was formed with a uniaxial pressing machine, the compact was processed for binder removal at 500° C., and then sintered in air at a sintering temperature of from 1300° C. to 1380° C. for 4 hours to give a sintered body.

A test piece was obtained by processing the obtained sintered body into a plate having a size of 10 mm×10 mm×1 mm, with which an ohmic electrode was formed. The test piece was tested with a resistance meter to determine its resistivity change in a temperature range from room temperature to 270° C. The measurement results are shown in Table 1. The test piece was analyzed for the constitutive elements Bi and Na, and the ratio of Bi/Na was determined. The results are shown in Table 1. In producing Sample No. 5 in Table 1, the powders were mixed in dry in air in the step of preparing the calcined $(BiNa)TiO_3$ powder, and except this, the ingredients were mixed in ethanol. The sample numbered with * is Comparative Example.

Comparative Example 1

Figure 2:
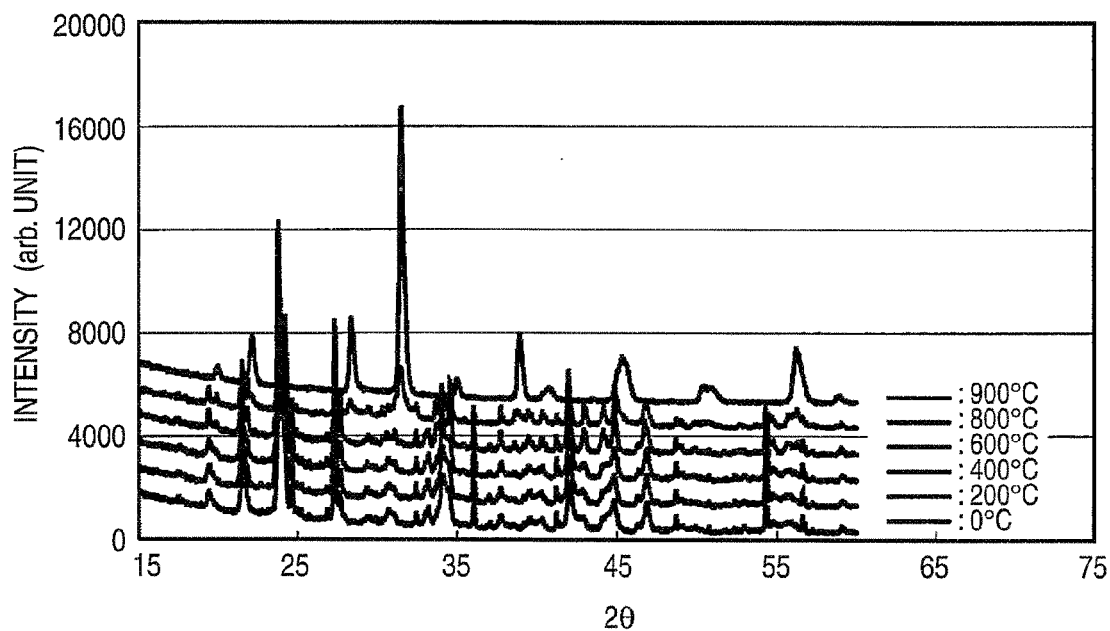
FIG. 2 is a graph showing the X-ray diffraction patterns of a semiconductor ceramic composition of Comparative Example at different calcination temperatures.

$BaCO_3$ and $TiO_2$ as main materials, $Nb_2O_5$ as a semiconductor ingredient powder, and $Na_2CO_3$, $Bi_2O_3$ and $TiO_2$ as Curie temperature shifters were prepared, and all these constituents were mixed all at a time from the beginning, and further, 0.9 mol % of $SiO_2$ and 1.9 mol % of $CaCO_3$ were added thereto as sintering promoters, and these were mixed in ethanol. The mixed material powder thus obtained was calcined in air at 200° C. to 1200° C. for 4 hours to give a calcined powder. FIG. 2 shows the X-ray diffraction patterns of the obtained $[(Bi_{0.5}Na_{0.5})_xBa_{1-x}][Ti_{1-y}M_y]O_3$ calcined powder (x=0.06, y=0.005) at different calcination temperatures of from 200° C. to 900° C.

PVA was added to the powder calcined at 1000° C., followed by mixing, and the mixture was granulated with a granulator. The granulated powder thus obtained was formed with a uniaxial pressing machine, the compact was processed for binder removal at 500° C., and then sintered in air at a sintering temperature of 1320° C. for 4 hours to give a sintered body.

A test piece was obtained by processing the obtained sintered body into a plate having a size of 10 mm×10 mm×1 mm, with which an ohmic electrode was formed. The test piece was tested with a resistance meter to determine its resistivity change in a temperature range from room temperature to 270° C. The measurement results are shown in Table 1 as Sample No. 6. The test piece was analyzed for the constitutive elements Bi and Na, and the ratio of Bi/Na was determined. The result is shown in Table 1 as Sample No. 6.

As can be clearly seen from FIG. 1 and FIG. 2, the calcined $(BiNa)TiO_3$ powder in Example 1 formed a completely single phase at 700° C. On the other hand, it is shown that, in Comparative Example 1 in which all the constitutive elements were mixed all at a time from the beginning, complete dissolution could not be attained until the temperature becomes not lower than 900° C., and it was not sufficient as a calcined powder.

As can be clearly seen from Table 1, the semiconductor ceramic compositions according to the invention have an increased Curie temperature and have a significantly reduced resistivity at room temperature. Since the step of preparing the $Ba(TiNb)O_3$ calcined powder and the step of preparing the $(BiNa)TiO_3$ calcined powder were conducted separately, Bi was restrained from vaporizing, and even after sintered, the composition could have a high Bi/Na ratio, and therefore, the formation of different phases was restrained in the composition, and the resistivity at room temperature was further lowered and the Curie temperature fluctuation was restrained.

As opposed to this, the temperature coefficient of resistance of the semiconductor ceramic composition of Comparative Example was low though the Curie temperature thereof was elevated. In addition, in the calcination step and in the sintering step, much Bi vaporized away, and the Bi/Na ratio in the sintered body was 0.77 or lower.

In all Examples, the temperature coefficient of resistance was calculated according to the following formula:

$$TCR = (\ln R_1 - \ln R_c) \times 100 / (T_1 - T_c)$$

wherein $R_1$ means the maximum resistivity; $R_c$ means the resistivity at $T_c$; $T_1$ means the temperature at which the composition has $R_1$; and $T_c$ means the Curie temperature.

TABLE 1

| Sample No. | Calcination Temperature of (BiNa)TiO₃ (° C.) | Sintering Temperature (° C.) | Bi/Na Ratio (x) | ρ30 (Ωcm) | Tc (° C.) | Temperature Coefficient of Resistance (%/° C.) |
|---|---|---|---|---|---|---|
| 1 | 800 | 1300 | 0.99 | 138 | 149 | 22.6 |
| 2 | 800 | 1320 | 0.97 | 84 | 158 | 19.9 |
| 3 | 800 | 1340 | 0.94 | 72 | 155 | 19.5 |
| 4 | 800 | 1380 | 0.91 | 96 | 161 | 17.8 |
| 5 | 800 | 1320 | 0.97 | 81 | 157 | 20.3 |
| 6* | — | 1320 | 0.76 | 73 | 160 | 16.9 |

While the invention has been described in detail and with reference to specific embodiments thereof, it will be apparent to one skilled in the art that various changes and modifications can be made therein without departing from the spirit and scope thereof.

INDUSTRIAL APPLICABILITY

The semiconductor ceramic composition according to the invention is optimal as a material for a PTC thermistor, a PTC heater, a PTC switch, a temperature detector, and the like.

The invention claimed is:

1. A process for producing a semiconductor ceramic composition in which a part of Ba in BaTiO$_3$ is substituted with Bi—Na, the process comprising a step of preparing a calcined powder of Ba(TiM)O$_3$ (wherein M is a semiconductor dopant), a step of preparing a calcined powder of (BiNa)TiO$_3$, a step of mixing the calcined powder of Ba(TiM)O$_3$ and the calcined powder of (BiNa)TiO$_3$, and a step of forming and sintering the mixed calcined powder.

2. The process for producing a semiconductor ceramic composition as claimed in claim 1, wherein a calcination temperature in the step of preparing the calcined powder of Ba(TiM)O$_3$ is from 900 to 1300° C.

3. The process for producing a semiconductor ceramic composition as claimed in claim 1, wherein a calcination temperature in the step of preparing the calcined powder of (BiNa)TiO$_3$ is from 700 to 950° C.

4. The process for producing a semiconductor ceramic composition as claimed in claim 1, wherein a dry mixing is conducted in the step of mixing the calcined powder of Ba(TiM)O$_3$ and the calcined powder of (BiNa)TiO$_3$.

5. The process for producing a semiconductor ceramic composition as claimed in claim 1, wherein 3.0 mol % or less of Si oxide and 4.0 mol % or less of Ca carbonate or Ca oxide are added before the calcination in the step of preparing the calcined powder of Ba(TiM)O$_3$ or the step of preparing the calcined powder of (BiNa)TiO$_3$ or in both the two steps.

6. The process for producing a semiconductor ceramic composition as claimed in claim 1, wherein 3.0 mol % or less of Si oxide and 4.0 mol % or less of Ca carbonate or Ca oxide are added in the step of mixing the calcined powder of Ba(TiM)O$_3$ and the calcined powder of (BiNa)TiO$_3$.

7. The process for producing a semiconductor ceramic composition as claimed in claim 1, wherein the semiconductor dopant M is at least one of Nb and Sb, and the semiconductor ceramic composition is represented by a composition formula: $[(BiNa)_x Ba_{1-x} Ti_{1-y} M_y]O_3$ in which x and y each satisfy $0 < x \leqq 0.3$ and $0 < y \leqq 0.005$.

8. The process for producing a semiconductor ceramic composition as claimed in claim 7, wherein a ratio of Bi to Na satisfies a relationship that Bi/Na is 0.78 to 1.

* * * * *